Dec. 21, 1954    M. W. STURDEVANT    2,697,234
LOCATION FINDER DEVICE
Filed June 13, 1952    2 Sheets-Sheet 1

INVENTOR.
MARION W. STURDEVANT
BY M. Y. Charles
ATTORNEY.

Dec. 21, 1954
M. W. STURDEVANT
LOCATION FINDER DEVICE
2,697,234
Filed June 13, 1952
2 Sheets-Sheet 2
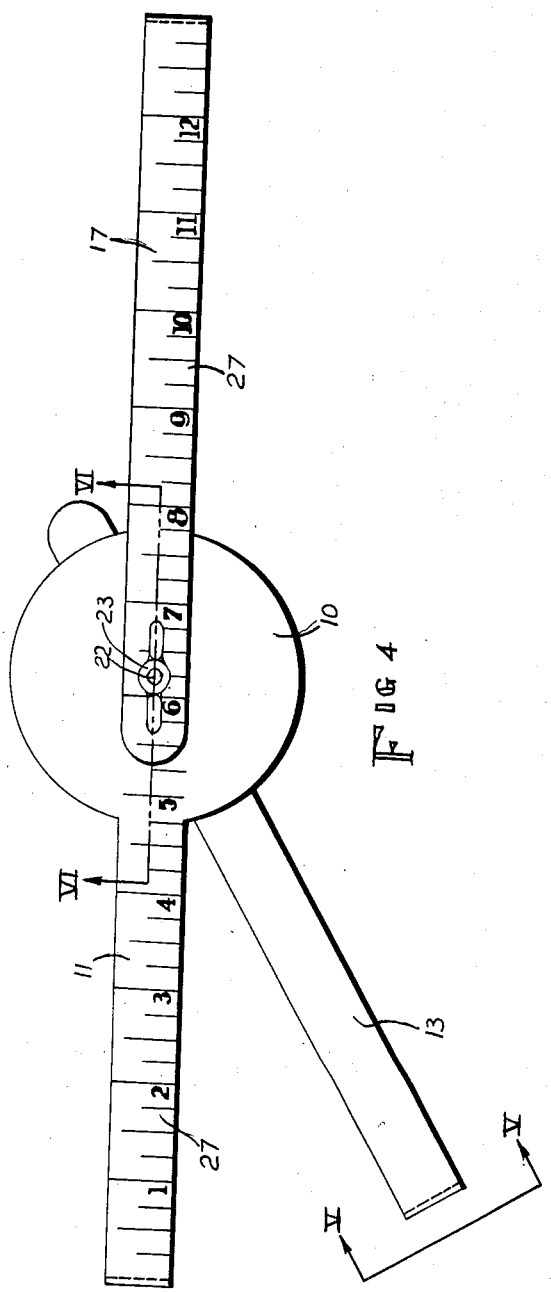
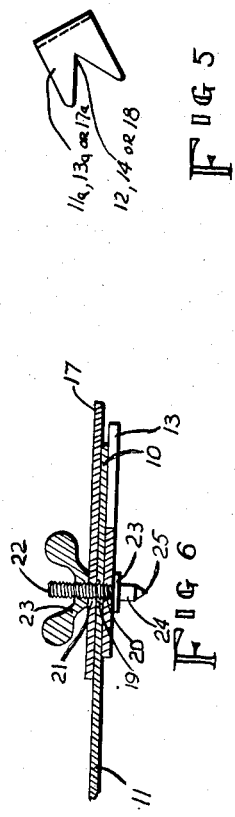
INVENTOR.
MARION W. STURDEVANT
BY M. Y. Charles
ATTORNEY.

United States Patent Office 2,697,234
Patented Dec. 21, 1954

2,697,234

LOCATION FINDER DEVICE

Marion W. Sturdevant, Rochester, Minn.

Application June 13, 1952, Serial No. 293,255

3 Claims. (Cl. 7—5.3)

My invention relates to an improvement in location finder devices. This device is particularly useful and advantageous to fishermen who fish in a lake and would like to return to the same place time after time, in view of the fact that they seem to have particularly good luck in catching fish at that particular place. Because the location is out in a large or comparatively large body of water the particular place the fisherman wants to return to at some future time cannot be marked, therefore some other means of relocating the same location must be used. While the device is particularly useful for fishermen as above mentioned the device will work equally well for refinding locations on land as well as on water.

The principal object of my invention of course is to re-locate a previously established location. Inasmuch as the device is made more particularly for the use of fishermen, other features incidental to the sport of fishing are included in the device and will be described as this description progresses.

A further object of the invention is to provide a device of the kind mentioned that is simple and easy to make and use, one that is inexpensive, durable and long lived, one that is small and can be easily compacted for transportation or carrying in one's pocket or fishing kit. These and other objects of the invention will be more fully explained as this description progresses.

Now referring to the accompanying drawings in which similar numerals of reference designate the same parts throughout the several figures of the drawings:

Fig. 4 is a bottom plan view of the device.

Fig. 5 is an outer end view of any one of the finder legs, the view being as seen from the line V—V in Fig. 4 and looking in the direction of the arrows.

Fig. 6 is a sectional view through the central portion of the device, the view being as seen from the line V—V in Fig. 4 and looking in the direction of the arrows.

Figure 1:
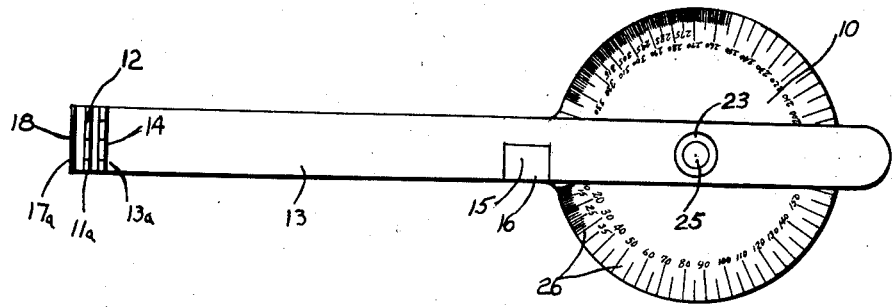
Fig. 1 is a top plan view of the device in its folded position for carrying purposes.

In the drawings the device is shown as having a circular plate 10 on which is integrally formed radially and outwardly extending finder arm 11, the outer end of which is turned upwardly as at 11a and in the upper end of the turned up end 11a is a V-shaped cut 12 for purposes that will later be described.

The device is provided with a second finder leg 13 the outer end of which is turned upwardly as at 13a and the end of the turned up portion 13a is provided with a V-shaped cut 14 that may be swung into registry with the V-shaped cut 12. The inner end of the finder leg 13 passes over the upper side and center of the circular plate 10 and is pivotally attached thereto, as will later be described.

The finder leg 13 is swingable over the leg 11 in a shearing action thereagainst. The leg 13 is provided with a beveled edge portion 15, that presents a sharp shearing edge 16 for cutting purposes as will later be described.

The device is further provided with a third finder leg 17, the outer end of which is turned upwardly as shown at 17a and the upper end of the turned up portion 17a is provided with a V-shaped cut 18, which may be swung into registry with the other V-shaped cuts 12 and 14. The other end of the finder leg 17 passes beneath the circular plate 10 and across the center thereof. The circular plate 10 has a bolt hole 19 in the center thereof. Also the inner end of the finder leg 13 has a bolt hole 20 therein and the inner end of the finder leg 17 has a bolt hole 21 therein and the holes 19, 20 and 21 are placed in registry with each other, whereupon a stud bolt 22 is passed therethrough and a wing-nut 23 is threaded thereon to hold the several parts of the device in their assembled and adjusted positions as will later be described.

The head end of the stud bolt 22 is provided with a shoulder or washer like formation 23 that bears against the finder leg 13. The shoulder end of the stud bolt 22 is provided with an axially extending portion 24, the end of which is cone shaped as at 25 and the apex 25 of the cone provides a sight point for use in association with the V-shaped cuts 12, 14 and 18, as will later be described.

The outer edge of the circular plate 10 has a protractor 26 marked thereon, for purposes that will later be described.

The under side of the finder legs 11 and 17 have a scale of inches 27 marked thereon so that when the two legs are positioned in alignment, each with the other, a scale of inches amounting to preferably one foot will be available for use in the measuring the length of fish or any other object.

The device is usable for several purposes, principally that of re-finding a location, also that of having a shear for cutting fish lines and the like in preparing fishing tackle of various kinds for use and the measuring feature above mentioned, and while the V-shaped cuts 12, 14 or 18 are for sighting purposes, they also provide a shape on the finder legs 11, 13 or 17 that is useful in assisting the fisherman to remove fish hooks from the mouth or throat of a fish after the fish has been caught and landed.

Now to use the device in re-locating a position, while the user of the device is on the position that he wishes to return to, he may hold the device before his eye and swing the legs 13 and 17 on opposite sides of the leg 11, whereupon he may sight over the point 25 of the stud 24 along the legs 11, 13 and 17 to see through the V-shape cut 14 to locate a land mark such as a stump and through the V-shaped cut 12, to locate another land mark such as a house and tree and to see through the V-shaped cut 18 to see a third land mark such as a tree. The finder legs being moved to such positions that all of these land marks are visible in their respective V-shaped cut 14, 12 and 18.

Figure 2:
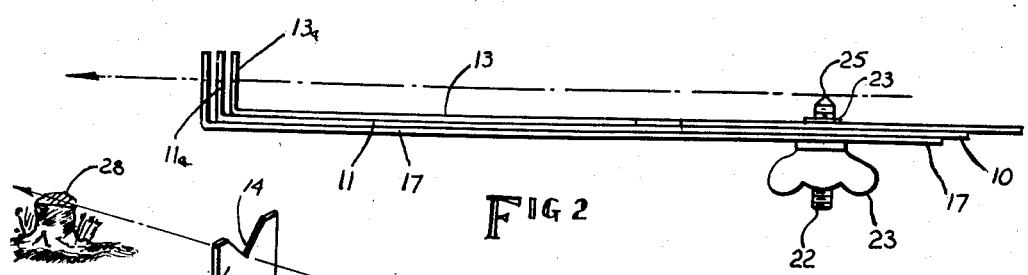
Fig. 2 is a side view of the device shown in Fig. 1.
Figure 3:
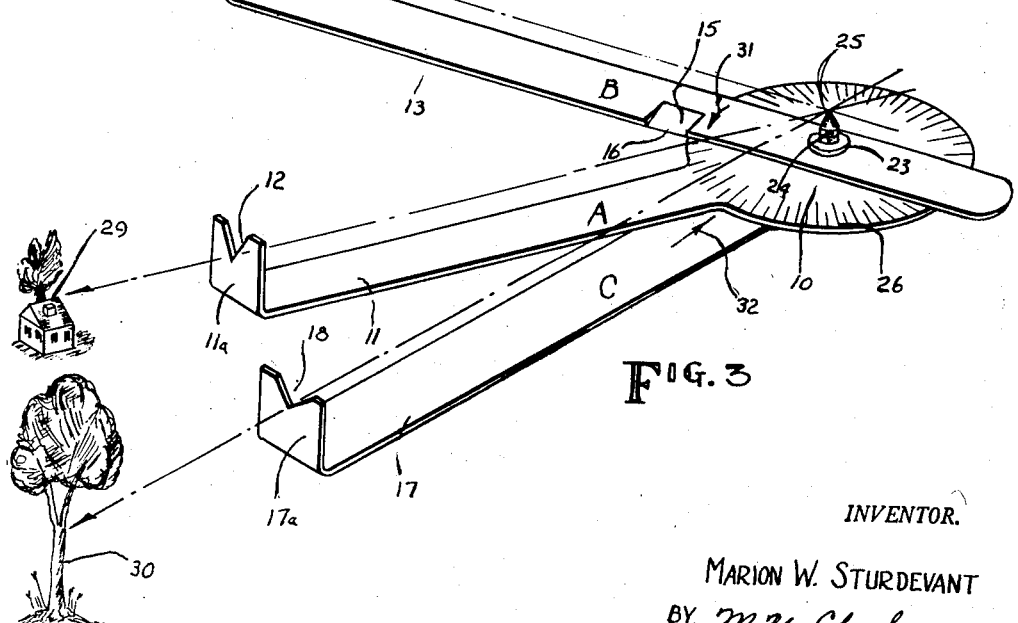
Fig. 3 is a perspective view of the device and illustrates its use.

The land marks having thus been located, the readings on the protractor pointed to by the indicating arrows 31 and 32 on the finder legs 13 and 17 may be noted or recorded, whereupon the device may be folded up as shown in Figs. 1 and 2 and put away for future use.

At some future time when the fisherman wants to return to the original location where he was previously, he may reset the finder legs of the device in the positions of his recording that he previously made and go somewhere in the neghborhood of that vicinity as nearly as he can estimate, whereupon he may use the location finder and sight across the sight point 25 and through the V-shaped cuts and move in whatever direction necessary and bring the land marks 28, 29 and 30 into their respective V-shaped cut 12, 14 and 18 and when this is accomplished the fisherman will be in precisely the original location, having thus accomplished the chief object of the invention.

Now while the device as shown and described is probably the preferred form of the device, it is to be understood that such modifications of the device may be employed as lie within the scope of the appended claims without departing from the spirit and intention of the invention.

Now having fully shown and described my invention, what I claim is:

1. In a location finder device of the kind described; said device having a protractor plate having a full circle protractor thereon, a first location finder arm, said first location finder arm being integrally formed on the protractor plate and projecting radially therefrom, the outer end of the location finder arm being turned upwardly from the upper face of the protractor carrying face of the protractor plate, the upper end portion of the turned up end of the location finder arm having a V-shaped sight formation therein, a pivotal mounting, said pivotal mounting being in the center of the protractor plate and protractor, a second location finder arm, said second location finder arm being pivotally mounted on the said pivotal mounting, said second location finder arm having one end thereof turned upwardly and parallel to the turned up portion of the said first location finder arm and the upper end portion of the last mentioned upturned end having a V-shaped sight formation therein, said second location finder arm being revolvable over the protractor plate and protractor thereon and over said first location finder arm, and the upturned end of said second location finder arm being passable by the upturned end of said first location finder arm, said second location finder arm being angularly positionable relative to said first location finder arm by means of readings taken from the protractor at one edge of said second location finder arm at the time of a previous setting of said second location finder arm, a third location finder arm, one end of said third location finder arm being pivotally mounted on the same pivotal mounting element as said second location finder arm is mounted on and said third location finder arm being revolvably positioned against the under side of the protractor plate and said first location finder arm, and means on said third location finder arm and co-operable with the said protractor for determining and resetting said third location finder arm in a previously determined position relative to said first location finder arm, the outer end portion of said third location finder arm being turned upwardly in substantially a parallel position to the turned up portions of said first and second location finder arms and being passable past the other turned up arm portions as said third arm may be revolved around its pivotal mounting, the upper end portion of the turned up end of said third arm having a V-shaped sight formation therein, all of the said V-shaped sight formations being registerable each with the other when the said location finder arms are positioned one over the other, and means on the pivotal mounting element for finding and holding the location finder arms in relative adjusted positions, a sight point, said sight point being carried by the said pivotal mounting element in position to be seen in any and all of the aforesaid V-shaped sight formations.

2. In a combination location finder and utility device of the kind described; the structure, parts and arrangement thereof as defined in claim 1, in which one of the said second or third location finder arms has a bevelled portion therein to shear against said first location finder arm for cutting purposes.

3. In a sportsman's multi-purpose utility device of the kind described; the structure, elements and arrangement thereof as defined in claim 1, in which two of the location finder legs have marks of linear measurement thereon and in such arrangement that when the two legs are moved into alignment with each other a continuous linear measure of substantially double the length of either of the two legs is effected.

References Cited in the file of this patent

UNITED STATES PATENTS

| Number | Name | Date |
|---|---|---|
| 462,234 | Brotherhood | Nov. 3, 1891 |
| 807,153 | Clark | Dec. 12, 1905 |
| 1,050,393 | Raymond | Jan. 14, 1913 |
| 1,519,082 | Howe | Dec. 9, 1924 |
| 2,008,113 | Sherritt | July 16, 1935 |

FOREIGN PATENTS

| Number | Country | Date |
|---|---|---|
| 407,325 | France | Sept. 22, 1909 |